(12) United States Patent
Knox

(10) Patent No.: US 7,013,736 B2
(45) Date of Patent: Mar. 21, 2006

(54) SENSOR FOR BELT RETRACTOR

(76) Inventor: Matthew J. Knox, 16403 Ironstone La., Romulus, MI (US) 48174

( * ) Notice: Subject to any disclaimer, the term of this patent is extended or adjusted under 35 U.S.C. 154(b) by 0 days.

(21) Appl. No.: 10/840,031

(22) Filed: May 5, 2004

(65) Prior Publication Data

US 2005/0247135 A1    Nov. 10, 2005

(51) Int. Cl.
 *G01N 3/08* (2006.01)
(52) U.S. Cl. ..................... 73/826; 242/107.4
(58) Field of Classification Search .................. 73/826
 See application file for complete search history.

(56) References Cited

U.S. PATENT DOCUMENTS

| | | | |
|---|---|---|---|
| 3,901,459 A | * | 8/1975 | Romanzi et al. .......... 242/384.1 |
| 3,911,391 A | | 10/1975 | Held et al. |
| 3,981,518 A | | 9/1976 | Pulling |
| 4,097,699 A | | 6/1978 | Larson |
| 4,262,858 A | | 4/1981 | Takada |
| 4,314,680 A | * | 2/1982 | Takada ....................... 242/384 |
| 4,329,549 A | | 5/1982 | Breed |
| 4,382,564 A | | 5/1983 | James |
| 4,410,875 A | | 10/1983 | Spies et al. |
| 4,484,041 A | | 11/1984 | Andres et al. |
| 4,608,501 A | | 8/1986 | Andres et al. |
| 4,638,179 A | | 1/1987 | Mattes et al. |
| 4,639,563 A | | 1/1987 | Günther |
| 4,827,091 A | | 5/1989 | Behr |
| 4,844,374 A | | 7/1989 | Mori |
| 4,889,068 A | | 12/1989 | Tabata et al. |
| 4,915,411 A | | 4/1990 | Norton |
| 4,955,638 A | | 9/1990 | Kinoshita et al. |
| 4,985,835 A | | 1/1991 | Sterler et al. |
| 5,005,861 A | | 4/1991 | Breed et al. |
| 5,011,182 A | | 4/1991 | Husby et al. |
| 5,100,169 A | | 3/1992 | Goor et al. |
| 5,177,370 A | | 1/1993 | Meister |
| 5,184,844 A | | 2/1993 | Goor |
| 5,261,506 A | | 11/1993 | Jost |
| 5,375,908 A | | 12/1994 | Goor |
| 5,390,952 A | | 2/1995 | Goor |
| 5,430,334 A | | 7/1995 | Meister |
| 5,449,198 A | | 9/1995 | Jeenicke et al. |
| 5,485,041 A | | 1/1996 | Meister |
| 5,620,203 A | | 4/1997 | Jeenicke et al. |
| 5,622,327 A | | 4/1997 | Heath et al. |
| 5,706,181 A | | 1/1998 | Dirmeyer et al. |
| 5,895,071 A | | 4/1999 | Norton |
| 6,139,053 A | | 10/2000 | Knox |
| 6,299,093 B1 | | 10/2001 | Harte et al. |
| 6,386,472 B1 | * | 5/2002 | Rogers, Jr. .................. 242/384 |
| 6,435,442 B1 | | 8/2002 | Kielwein et al. |
| 6,659,505 B1 | | 12/2003 | Knox |

FOREIGN PATENT DOCUMENTS

CA    1160604    1/1984

* cited by examiner

*Primary Examiner*—Edward Lefkowitz
*Assistant Examiner*—Linda Field
(74) *Attorney, Agent, or Firm*—Sally J Brown

(57) ABSTRACT

A sensor for a vehicle belt retractor includes a housing, an excitation mass, a locking mechanism which locks the belt retractor, and a lever arm connected to the housing. The lever arm is in contact with the excitation mass and engages the locking mechanism when the excitation mass moves relative to the housing. The sensor further includes a damper that restricts vertical displacement of the excitation mass relative to the housing.

13 Claims, 5 Drawing Sheets

SENSOR FOR BELT RETRACTOR

BACKGROUND

This invention relates to a sensor for a vehicle seat belt retractor. More specifically, the present invention relates to a sensor that reduces or eliminates nuisance locks of seat belt retractors.

In order to provide enhanced comfort and convenience, seat belt retractors employ a mechanism to allow the belt webbing to be freely extended and retracted from the retractor as the vehicle occupant moves in the seat. Of course, in order to provide its occupant protection function, the retractor must lock to prevent webbing pullout as the occupant loads the belt in an impact condition. Most vehicles incorporating such so called emergency locking retractors employ a pendulum or roll ball type inertia sensor in the retractor.

Sensor strategies employed in primary occupant restraint applications must be capable of sensing low "g" or vehicle tilt angles generated during sudden vehicle braking conditions or vehicle roll over events. Sensing these vehicle conditions reliably is paramount to properly restraining the occupant within the seat.

Ideally, a common use retractor sensor design is the preferred choice when used in high volume automotive applications; however, vehicle types and road conditions generally cause the sensor to sacrifice comfort to the occupant in order to achieve FMVSS compliance. A common use design may not be suitable for all vehicles since some vehicles are stiffer or more dynamic than others depending on the road conditions. SUV's and both heavy and light trucks, for example, are more sensitive to conditions of the road, resulting in the vehicle becoming more dynamic in comparison to a small or luxury car (i.e., the vehicle experiences higher pitch, roll, and jounce accelerations in normal driving conditions). Moreover, the position in the vehicle at which the retractor mounted may influence the performance of the sensor. For instance, a retractor mounted low in the vehicle is less sensitive to some of the aforementioned accelerations than a retractor mounted high in the vehicle. Thus, the dynamics of the vehicle, the mounting location of the retractor, and FMVSS performance requirements all directly influence the sensitivity and performance of a common use retractor inertia sensor.

Generally, as the vehicle becomes more subject to road induced accelerations, so does the sensor, creating occupant restraint comfort issues. Such vehicles and common use sensors typically generate hypersensitive retractors, resulting in a repetitive locking and unlocking of the primary restraint, an event commonly referred to as a retractor nuisance lock. Nuisance locks often cause the primary restraint/belts to bite/cinch down on the occupant, restricting occupant movement and causing discomfort to the occupant. Locking of the retractor in response to non-impact or non-rollover events is undesirable as it is an annoyance to the occupants.

Primary restraint sensors must be capable of sensing accelerations/forces in three-dimensional space, such as the space defined by the Cartesian axes X,Y,Z, in order to comply with FMVSS requirements. Such sensors have the ability to detect and communicate the presence of potential adverse frontal, rear, side, roll, braking or combinations of any of the aforementioned vehicle conditions. However, most nuisance locking conditions are generated by a sensor's inability to eliminate or reduce the influence of undesired sensitivity along the "Z" (or vertical) direction. For example, bumps in the road cause the sensor mass to bounce in the "Z" direction, potentially causing the retractor to lock/limit belt displacement. Most often these potential locking conditions result in the retractor to lock, resulting in a nuisance lock and discomfort to the occupant being restrained.

Many primary occupant restraint sensors employ a standing mass or ball excitation mass in combination with a housing and pivot arm to sense adverse vehicle conditions. These sensors often attempt to manage nuisance-locking conditions by changing the mass, the incline angle in which the mass rests, the distance between the inertia lever-arm and the locking mechanics of the retractor, or combinations of the aforementioned features. Unfortunately, when these critical characteristics are modified, the sensor is likely to become unique to a restraint/retractor, an application, an installation or a specific vehicle. The common use sensor, therefore, becomes less suited for diverse applications and is not well suited for the high volume, low cost demands of the automotive industry. Changes such as those mentioned also have the potential of making the sensor become less sensitive and even non-compliant with ECE or FMVSS regulatory performance requirements.

BRIEF SUMMARY OF THE INVENTION

The present invention provides a sensor used in primary restraint systems that reduces potential nuisance locks. The sensor includes a damper/restrictor that restricts a mass from bouncing away from a housing in which the mass rests when undisturbed. The damper allows the mass to move only in combined vertical and lateral directions, where, for example, gravitational acceleration occurs along the vertical direction, before activating the restraint locking mechanics.

Damping, de-sensitizing or restricting vertical movement of the mass does not interfere with FMVSS compliance regulations, rather, it more likely improves overall performance and comfort by reducing the number of false lock or nuisance lock conditions, thus promoting favorable FMVSS performance. Moreover, the sensor may be used in a variety of vehicles and applications; that is, the sensor may meet the objectives of a common use sensor.

Other features and advantages will be apparent from the following detailed description and from the claims.

DETAILED DESCRIPTION

Figure 1:
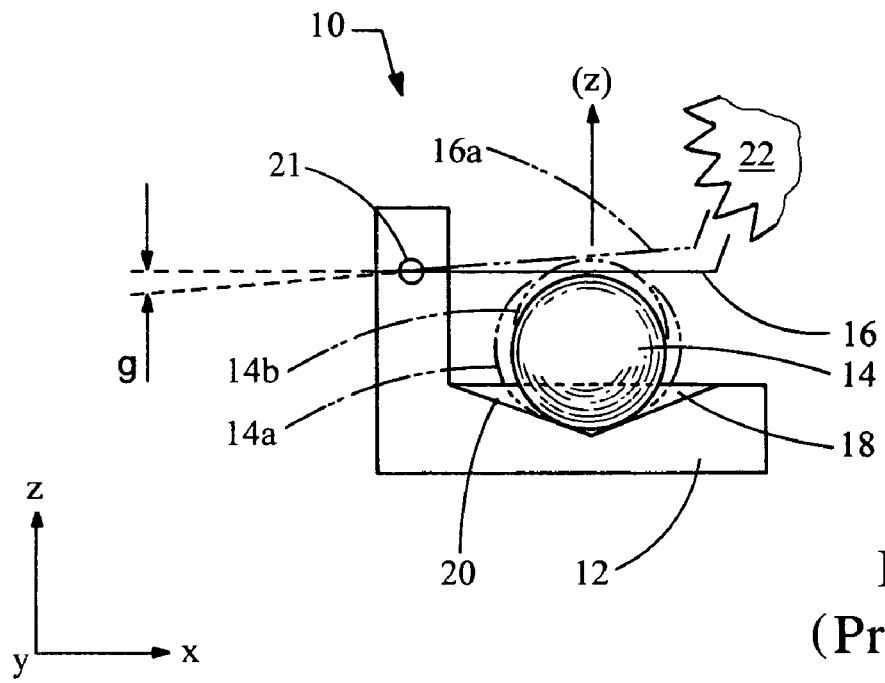
FIG. 1 depicts a conventional primary restraint sensor.

Referring to FIG. 1, there is shown a conventional primary restraint sensor 10 including a sensor housing 12, a mass 14, and a lever arm 16. The bottom portion of the housing 12 defines an indentation 18 with an inclined plane 20. When undisturbed, the mass 14, shaped as a sphere, rests at the bottom of the indentation 18, and the lever arm 16 attached to the upper portion of the housing 12 at a pivot point 21 rests on top of the mass 14, unengaged with a ratchet 22. A Cartesian coordinate system XYZ is shown in FIG. 1, as well as in the subsequent figures, for convenience, where the Z axis is typically aligned with gravitational forces. Vertical movement between the mass 14 and housing 12 is defined as movement along the Z direction and lateral movements are defined as movements in along the X and Y directions.

As a vehicle in which the restraint sensor 10 is mounted maneuvers over a road, the mass 14 moves up the incline plane 20 as designated at 14a and/or bounces up and down as designated at 14b, causing the lever arm 16 to pivot upwards as designated at 16b. Over rough roads, a conventional restraint sensor, such as the restraint sensor 10, experiences increased nuisance locking. The restraint sensor 10 many also experience nuisance locking as the vehicle maneuvers over smooth roads when, for example, the vehicle has a stiff body and/or stiff suspension. This occurs because the lever arm 16 moves upward equally in cases of the mass 14 moving purely vertically along the Z axis, or laterally along the X and Y axes.

Nuisance locks are the result of the sensor mass 14 bouncing up and down relative to the housing 12 causing the locking lever arm 16 to lock and unlock the retractor 24. That is, a vertical bounce of the vehicle is likely to cause the inertia lever arm to undesirably rise and engage the retractor locking mechanics causing a retractor nuisance lock.

Figure 2A:
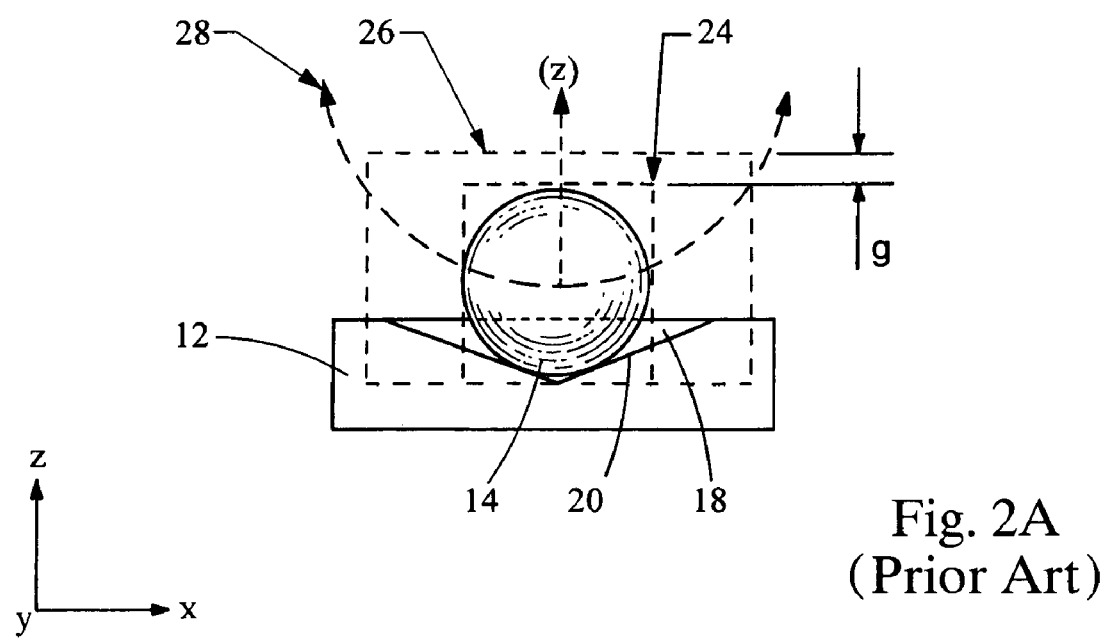
FIGS. 2A and 2B depict the lateral and vertical range of movement allowed by the primary restraint sensor of FIG. 1.
Figure 2B:
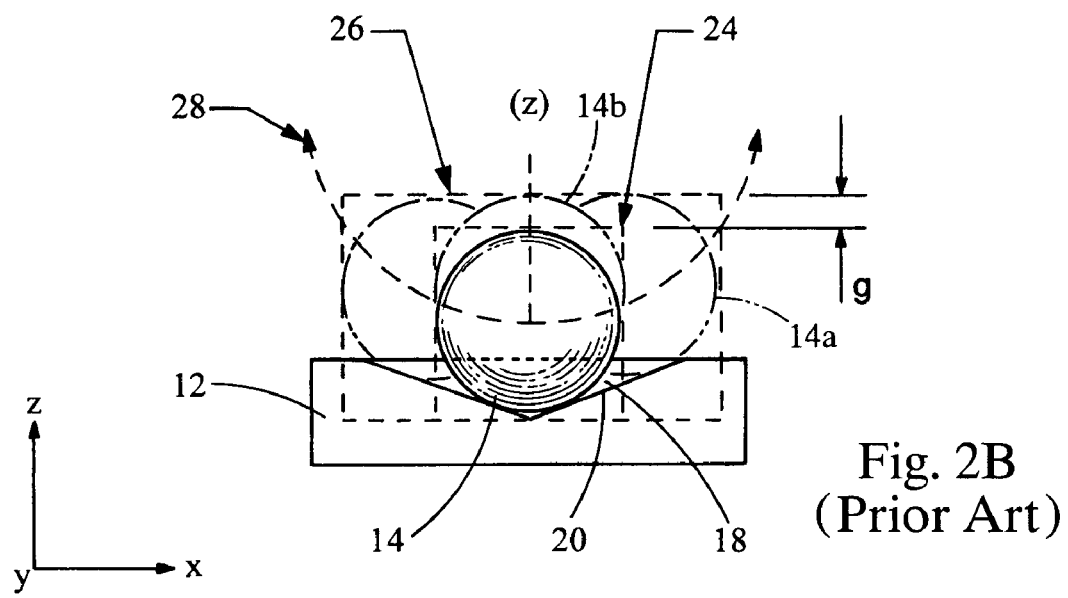

FIGS. 2A and 2B further illustrate the operation of the restraint sensor 10. Specifically, when the sensor mass 14 is at rest with no forces present to lift the mass 14 out of the indentation 18 or to move the mass 14 up the inclined plane 20, the mass 14 occupies a no lock zone 24 and the inertia lever/locking arm 16 is in the lowered position (FIG. 1), preventing the locking arm 16 from engaging the retractor ratchet wheel 22. In the event the sensor experiences lateral and/or vertical accelerations, the sensor mass 14 moves somewhere into the potential lock zone 26. For example, the mass may roll up the inclined plane 20 as indicated by the curved double arrow 28 because of lateral accelerations to the outer regions of the indentation 18 as designated at 14a. Moreover, since the vertical movement of the mass 14 is not constrained, any vertical accelerations in the Z direction may cause the mass 14 to bounce upward as designated at 14b. Note that distance between the top of the no lock zone 24 and that of the potential lock zone 26 defines a clearance (g), which corresponds to the clearance between the lever arm 16 and the retractor 22 when the mass 14 is in its rest position. Thus, for the lever arm 16 to engage the ratchet 22, and thus lock the restrainer 10, the mass 14 must move sufficiently enough to close the gap (g), at which moment the raised inertia lever/locking arm engages the retractor ratchet wheel, causing the primary restraint to lock.

The absence of lateral and/or vertical accelerations causes the sensor mass 14 to move back into its resting position in the no lock zone 24, resulting in the lowering of the inertia lever/locking arm 16 and disengagement of the retractor ratchet wheel 22, unlocking the retractor.

Figure 3:
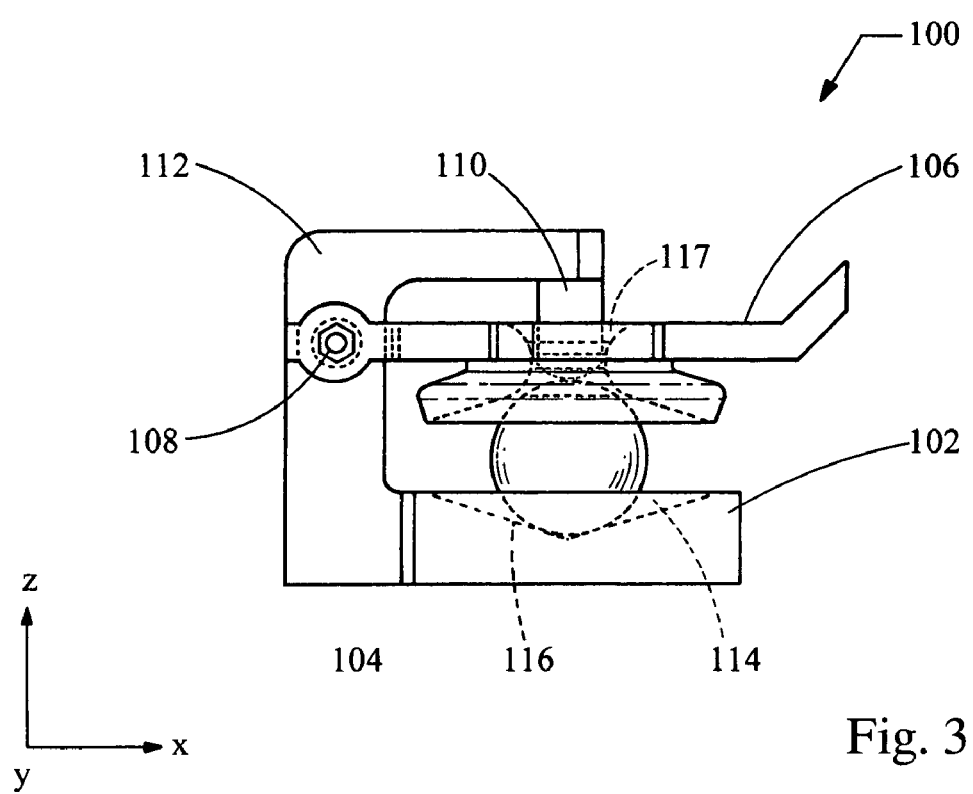
FIG. 3 depicts a primary restraint sensor with a vertical movement restrictor/damper in accordance with the invention.

Referring now to FIG. 3, a primary restraint sensor embodying the principles of the present invention is illustrated therein and designated at 100. The restraint sensor 100 is provided with damping features that minimize the effect bounce has on the sensor mass thus minimizing the premature locking of the retractor and resulting in the subsequent reduction of potential nuisance locks. The restraint sensor 100 becomes less sensitive to purely vertical motion of the excitation mass.

As its primary components, the sensor 100 includes a housing 102, a mass 104, a lever arm 106 attached to the housing 102 at a pivot point 108, and a damper 110.

The Z-axis damper or restrictor 110 is placed over the sensor mass 104 to prevent unwanted Z-axis or vertical movements. As such, the sensor mass 104 is able to move freely in the combined XYZ space, but not solely in the Z direction, resulting in the reduction of unwanted Z only movement influenced nuisance locks.

Figure 4:
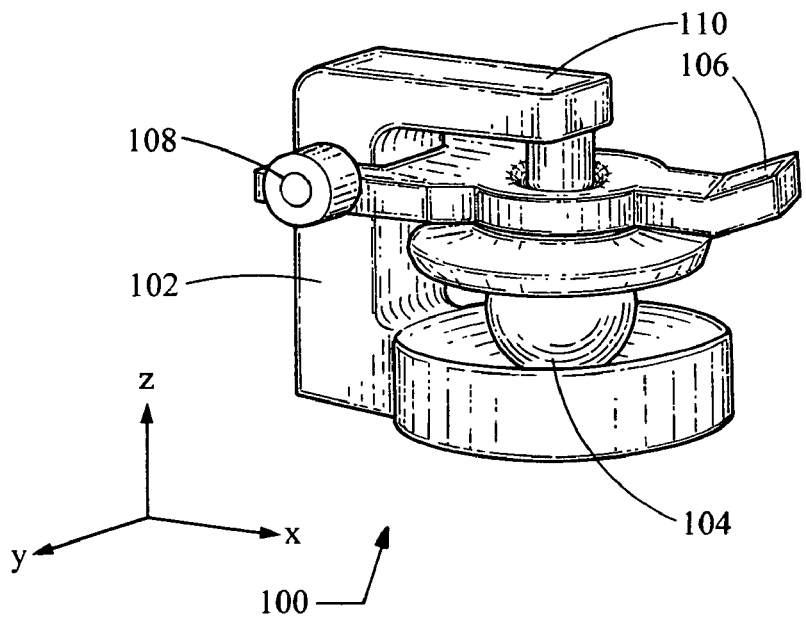
FIG. 4 is a perspective view of the primary restraint sensor of FIG. 3.

The bottom portion of the housing 102 defines an indentation 114 with an inclined plane 116. When undisturbed, the mass 104, shaped, for example, as a sphere, rests at the bottom of the indentation 114, and the lever arm 106 rests on top of the mass 104, unengaged with a ratchet 118 (FIG. 4).

The restrictor 110 extends over the sensor mass 104 and downward onto or in close proximity to the top of the sensor mass 104. The damper 110 provides adequate clearance around the sensor mass, allowing it to move freely in the for/aft and lateral directions yet restrict vertical movement. The inertia lever arm 106 incorporates a clearance hole 117 through which the restrictor or damper extends. This clearance hole 117 allows the inertia lever arm 106 to rise and fall relative to the controlled movement of the excitation mass 104. One end of the inertia lever arm pivots from the sensor housing and the other end free floats on top of the excitation mass. As the mass moves along the incline plane of the sensor housing, it causes the inertia lever to rise.

Figure 5:
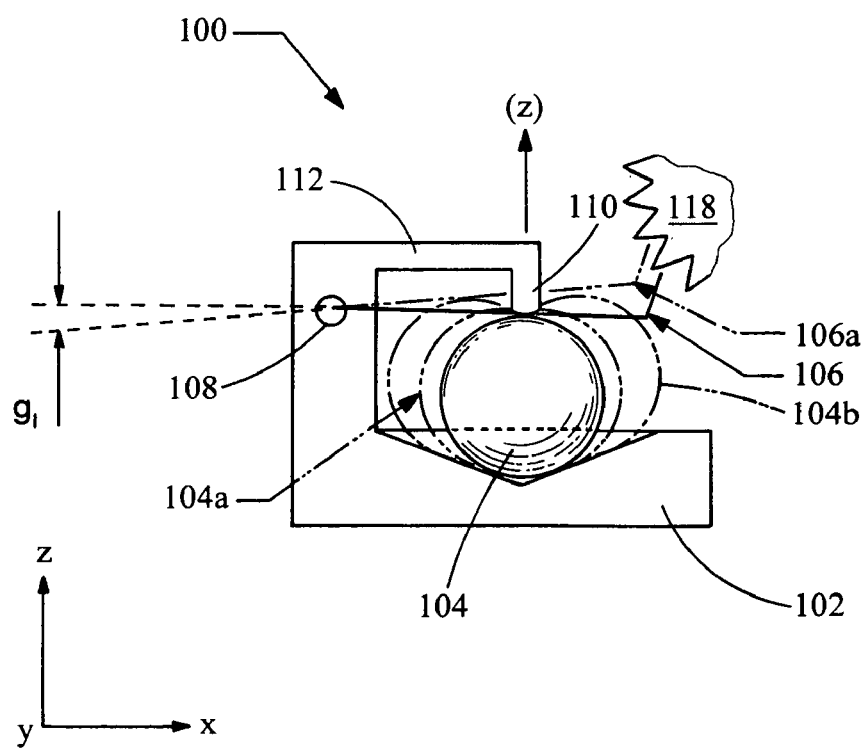
FIG. 5 is a schematic of the operation of the primary restraint sensor of FIG. 3.
Figure 6A:
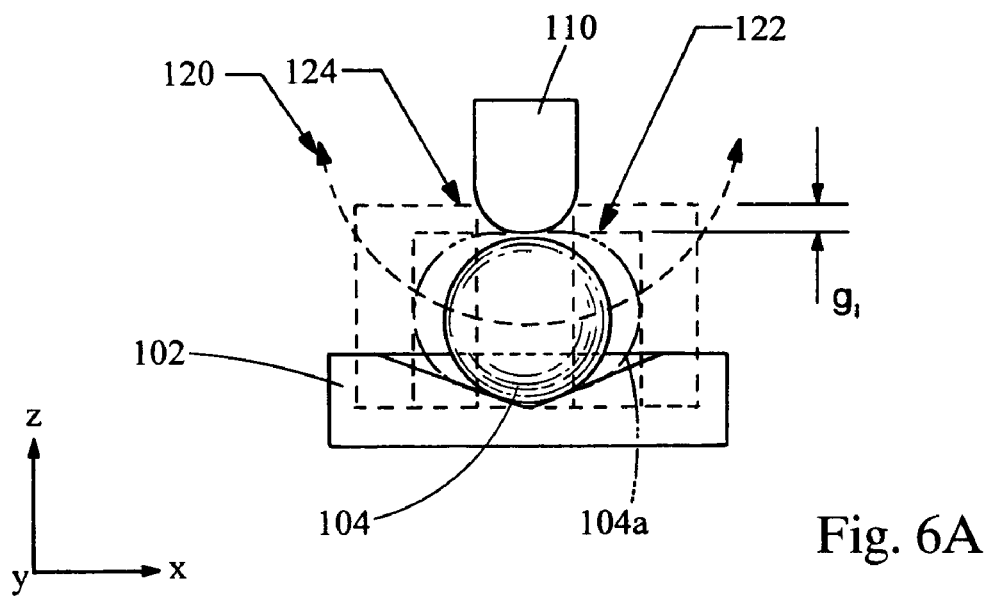
FIGS. 6A and 6B depict the lateral and vertical range of movement allowed by a primary restraint sensor of FIG. 3.
Figure 6B:
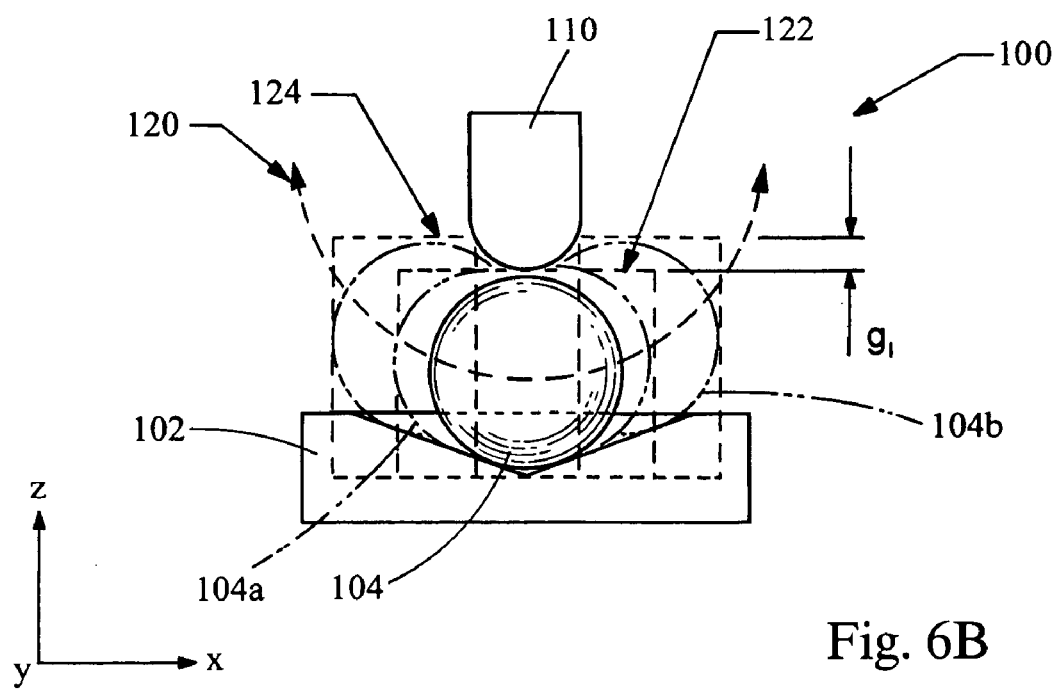

Referring to FIGS. 5 and 6A and 6B, the restrictor 110 allows the mass 104 to move only up the inclined plane 116. That is, the mass 104 is only allowed to roll up the inclined plane 116 as indicated by the double arrow 120 as is not allowed to bounce away from the housing in the Z direction. As the mass 104 moves slightly, as designated at 104a, as a result of lateral forces or combined lateral and vertical forces, the mass 104 remains in a no lock zone 122. Greater amount of forces causes the mass 104 to move to the outer regions of the indentation 114, as designated at 104b, occupying a potential lock zone 124. The distance between the top of the no lock zone 122 and that of the potential lock zone 124 defines a gap ($g_1$), which corresponds to the distance the lever arm 106 must travel from its lowered position to engage the ratchet 118.

Figure 7:
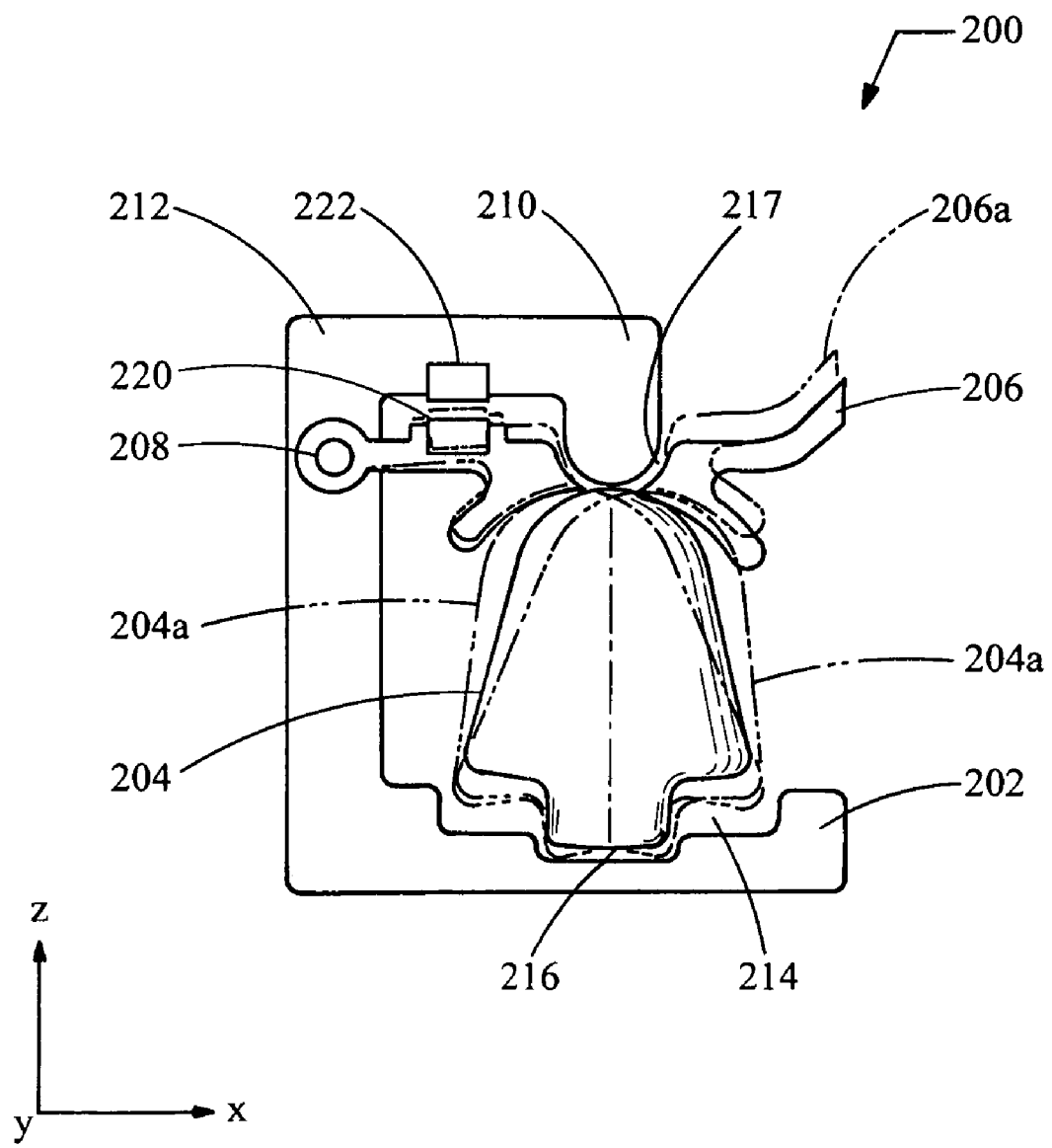
FIG. 7 is a side view of an another embodiment of a primary restraint sensor in accordance with the invention.

The inertia sensor arm dampers can be used in alternative types of sensors, such as the standing mass sensor designated at 200 in FIG. 7. The sensor 200 includes a housing 202, a mass 204, a lever arm 206 connected to the housing 202 at a pivot joint 208, and a damper 210 which extends from an upper portion 212 of the housing 202. The mass 204 rests in an indentation 214 and rocks about a pivot point 216 as a result of forces imparted on the mass 204. The side to side movements of the mass 204 are designated at 204a.

The restrictor 210 extends over the sensor mass 204 and downward onto or in close proximity to the top of the sensor mass 204. The damper 210 provides adequate clearance around the sensor mass, allowing it to move freely in the for/aft and lateral directions yet restrict vertical movement. The inertia lever arm 206 incorporates a clearance hole 217 through which the restrictor or damper extends. This clearance hole 217 allows the inertia lever arm 206 to raise and lower relative to the controlled movement of the excitation mass 204. One end of the inertia lever arm pivots from the sensor housing and the other end free floats on top of the excitation mass. As the mass 204 rocks about the pivot point 216, it causes the inertia lever to rise as designated at 206*a*.

In any of the sensors described above, additional dampers may be placed in the sensor to prevent cases of extreme bounce. For example, in the implementation shown in FIG. 7, dampers 220, 220 can be made up of opposing magnetic fields such as: south-to-south or north-to-north polarities. Alternatively, additional dampers can be implemented as low-compression/tension springs positioned between the upper portion 212 and the lever arm 206.

In addition to the implementations described above, other implementations of the invention are within the scope of the following claims.

What is claimed is:

1. A sensor for a seat belt retractor for a vehicle comprising:
   a housing;
   an excitation mass that is displaceable relative to the housing in response to inertial forces acting on the vehicle;
   a lever arm connected to the housing at a pivot point, the lever arm contacting the excitation mass upon a predetermined displacement of the excitation mass in response to the inertial forces and causing locking of the seat belt retractor upon the predetermined displacement of the excitation mass; and
   a damper that restricts vertical displacement of the excitation mass relative to the housing thereby restricting undesired locking of the seat belt retractor, the damper not restricting displacement of the excitation mass in response to the inertial forces acting on the excitation mass causing displacement in directions other than in the vertical direction.

2. The sensor of claim 1 wherein the excitation mass is a spherical mass.

3. The sensor of claim 1 wherein the housing is provided with an indentation in which the excitation mass resides when the inertial forces are not acting on the vehicle.

4. The sensor of claim 3 wherein the indentation is defined in part by an inclined surface, wherein displacement of the excitation mass relative to the housing includes a movement over the inclined surface.

5. The sensor of claim 1 wherein the lever arm is provided with a hole through which the damper extends.

6. The sensor of claim 1 wherein the excitation mass is a non-spherical mass that pivots about a point defined by the housing.

7. The sensor of claim 6 wherein the excitation mass moves the lever arm away from the point as the excitation mass pivots about the point.

8. The sensor of claim 1 wherein a gap exists between the lever arm and the excitation mass when the inertial forces are not acting on the vehicle.

9. The sensor of claim 8 wherein displacement of the excitation mass closes the gap.

10. The sensor of claim 8 wherein displacement of the excitation mass relative to the housing defines a no lock zone when the gap is greater than zero, the retractor being unlocked when the excitation mass occupies the no lock zone.

11. The sensor of claim 8 wherein the movement of the excitation mass relative to the housing defines a lock zone when the excitation mass undergoes the predetermined displacement and excitation mass contacts the lever arm, the retractor being locked when the excitation mass occupies the lock zone.

12. The sensor of claim 1 further comprising one or more additional dampers for restricting vertical displacement of the excitation mass.

13. The sensor of claim 12 wherein at least one of the additional damper provides opposing magnetic fields.

* * * * *